US010607786B2

(12) United States Patent
Akazawa et al.

(10) Patent No.: US 10,607,786 B2
(45) Date of Patent: Mar. 31, 2020

(54) ELECTROLYTIC SOLUTION FOR ALUMINUM ELECTROLYTIC CAPACITOR AND ALUMINUM ELECTROLYTIC CAPACITOR USING SAME

(71) Applicant: SANYO CHEMICAL INDUSTRIES, LTD., Kyoto (JP)

(72) Inventors: Yoshihiko Akazawa, Kyoto (JP); Koshiro Kondo, Kyoto (JP); Hideki Kimura, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 339 days.

(21) Appl. No.: 15/555,586

(22) PCT Filed: Feb. 25, 2016

(86) PCT No.: PCT/JP2016/055606
§ 371 (c)(1),
(2) Date: Sep. 5, 2017

(87) PCT Pub. No.: WO2016/143535
PCT Pub. Date: Sep. 15, 2016

(65) Prior Publication Data
US 2018/0047514 A1  Feb. 15, 2018

(30) Foreign Application Priority Data

Mar. 11, 2015 (JP) .................. 2015-048097
Nov. 18, 2015 (JP) .................. 2015-225601

(51) Int. Cl.
*H01G 9/035* (2006.01)
*H01G 9/045* (2006.01)
(52) U.S. Cl.
CPC ............. *H01G 9/035* (2013.01); *H01G 9/045* (2013.01)

(58) Field of Classification Search
CPC ............................. H01G 9/035; H01G 9/045
See application file for complete search history.

(56) References Cited

FOREIGN PATENT DOCUMENTS

| CN | 1430233 | 7/2003 |
|---|---|---|
| CN | 102194576 | 9/2011 |
| CN | 103811183 | 5/2014 |
| CN | 104240956 | 12/2014 |
| EP | 0 684 619 | 11/1995 |
| JP | 3-126209 | 5/1991 |
| JP | 5-144679 | 6/1993 |
| JP | 6-208934 | 7/1994 |
| JP | 2001-76974 | 3/2001 |
| JP | 2006-186217 | * 7/2006 |
| JP | 2008-78687 | 4/2008 |
| JP | 2011-3813 | 1/2011 |
| JP | 2011-071238 | 4/2011 |
| JP | 2012-028752 | 2/2012 |
| JP | 2013-38131 | 2/2013 |
| JP | 2015-026764 | 2/2015 |

OTHER PUBLICATIONS

International Search Report dated May 10, 2016 in International (PCT) Application No. PCT/JP2016/055606.

* cited by examiner

*Primary Examiner* — C Melissa Koslow
(74) *Attorney, Agent, or Firm* — Wenderoth, Lind & Ponack, L.L.P.

(57) ABSTRACT

The present invention aims to provide an electrolyte solution suitable for aluminum electrolytic capacitors which has a high spark voltage and whose conductivity does not decrease and remains sufficiently high even after heating. The electrolyte solution for aluminum electrolytic capacitors of the present invention contains a trihydric to octahydric poly alcohol alkylene oxide adduct (A), a secondary or tertiary amine, a carboxylic acid (C), and a polar solvent (D).

10 Claims, No Drawings

ELECTROLYTIC SOLUTION FOR ALUMINUM ELECTROLYTIC CAPACITOR AND ALUMINUM ELECTROLYTIC CAPACITOR USING SAME

TECHNICAL FIELD

The present invention relates to electrolyte solutions for aluminum electrolytic capacitors, and aluminum electrolytic capacitors using the same.

BACKGROUND ART

An aluminum electrolytic capacitor including an electrolyte solution consists of an anode made of aluminum having aluminum oxide as a dielectric on the surface, a cathode as a current collector, and a separator holding the electrolyte solution between the anode and the cathode, all enclosed in a sealed casing. Wound or laminated aluminum electrolytic capacitors are widely known. In these capacitors, the electrolyte solution directly contacts the dielectric and acts as the true cathode. The type of the electrolyte solution thus greatly affects the characteristics of the aluminum electrolytic capacitor.

In electrolytic capacitors, polar solvents (e.g., ethylene glycol) and ammonia salts of azelaic acid or 1,6-decanedicarboxylic acid are widely used (for example, see Patent Literature 1). It is known to further add polyvinyl alcohol or polyoxyethylene glycol to such electrolyte solutions in order to increase spark voltage (for example, see Patent Literature 2).

Unfortunately, polyvinyl alcohol is insoluble in polar solvents (e.g., ethylene glycol), thus making the resulting electrolyte solutions non-uniform. Such electrolyte solutions become more viscous when heated, and thus will be problematic for applications at high temperatures. In addition, polyoxyethylene glycol having a low molecular weight exhibits less improving effect on spark voltage, and polyoxyethylene glycol having a high molecular weight disadvantageously decreases conductivity.

CITATION LIST

Patent Literature

Patent Literature 1: JP 2001-76974 A
Patent Literature 2: JP 2008-78687 A

SUMMARY OF INVENTION

Technical Problem

The present invention aims to provide an electrolyte solution suitable for aluminum electrolytic capacitors which has a high spark voltage and whose conductivity does not decrease and remains sufficiently high even after heating.

Solution to Problem

The present inventors made studies to achieve the above aim and arrived at the present invention.

The present invention is directed to an electrolyte solution for aluminum electrolytic capacitors containing a trihydric to octahydric polyol alkylene oxide adduct (A), a secondary or tertiary amine (B), a carboxylic acid (C), and a polar solvent (D); and an aluminum electrolytic capacitor including the electrolyte solution.

Advantageous Effects of Invention

The electrolyte solution for aluminum electrolytic capacitors of the present invention has a high spark voltage and has the effect that the conductivity thereof does not decrease and remains high even after heating treatment.

DESCRIPTION OF EMBODIMENTS

The electrolyte solution for aluminum electrolytic capacitors of the present invention contains a trihydric to octahydric polyol alkylene oxide adduct (A), a secondary or tertiary amine (B), a carboxylic acid (C), and a polar solvent (D).

The alkylene oxide adduct (A) in the present invention is a compound obtained by adding an alkylene oxide to a trihydric to octahydric polyol. Examples of the alkylene oxide include ethylene oxide (hereinafter also abbreviated as BO), propylene oxide (hereinafter also abbreviated as PO), and butylene oxide. These may be used alone or in combination of two or more thereof.

The alkylene oxide in the alkylene oxide adduct (A) preferably includes ethylene oxide from the standpoint that the alkylene oxide adduct (A) easily permeates electrodes.

In the present invention, one alkylene oxide adduct (A) may be used alone, or two or more alkylene oxide adducts (A) may be used in combination.

From the standpoint of the low-temperature characteristics, ethylene oxide is preferably used in combination with other alkylene oxide(s). From the standpoint of increasing the spark voltage, ethylene oxide (EO) and propylene oxide (PO) are preferably used in combination as the alkylene oxide in the alkylene oxide adduct (A).

In this case, from the standpoint of making it easy for the alkylene oxide adduct (A) to permeate electrodes, the mole ratio of EO to PO (EO/PO) is preferably 50/50 to 99/1, more preferably 65/35 to 99/1.

In the alkylene oxide adduct (A), the hydroxy group at the terminal of the alkylene oxide, on the side opposite the polyol, may be replaced with an alkyl group, an allyl group, or the like.

The mole ratio EO/PO can be calculated by calculating the total molecular weight from the hydroxy value, determining the peak area ratio between the methyl group of PO and the methylene group of EO and PO with a proton nuclear magnetic resonance (H-NMR) device, and calculating the mole ratio from the obtained total molecular weight and peak ratio.

In the present invention, (A) is a trihydric to octahydric polyol alkylene oxide adduct. The use of a monohydric or dihydric alcohol alkylene oxide adduct leads to poor conductivity. The trihydric to octahydric polyol is preferably a trihydric to hexahydric polyol. Examples of the trihydric to octahydric polyol include glycerol, trimethylolpropane, hexitol, sorbitol, pentaerythritol, dipentaerythritol, and polyols obtained by reduction of sugars.

The alkylene oxide in the alkylene oxide adduct (A) preferably includes ethylene oxide. The average addition mole number of the ethylene oxide in (A) is more preferably 12.0 to 42.0, most preferably 18.0 to 30.0 mol. If the average addition mole number is smaller than 12.0 mol, the improving effect on the spark voltage is low. If the average addition mole number is greater than 42.0 mol, the viscosity is excessively high, leading to low conductivity.

The average addition mole number of ethylene oxide can be calculated by calculating the total molecular weight from the hydroxy value, determining the peak area ratio between the methyl group of PO and the methylene group of EO and PO with a proton nuclear magnetic resonance (H-NMR) device, and calculating the average addition mole number from the obtained total molecular weight and the peak ratio.

The trihydric to octahydric polyol alkylene oxide adduct (A) preferably has a number average molecular weight of 1,000 to 2,200, from the standpoint of the conductivity. Here, this number average molecular weight means the number average molecular weight calculated from the hydroxy value. The hydroxy value is measured according to the method specified in JIS-K 1557-1.

The alkylene oxide adduct (A) is typically synthesized by reaction of a trihydric to octahydric polyol with an alkylene oxide in the presence of a potassium hydroxide or sodium hydroxide catalyst.

When EO and PO are used in combination as the alkylene oxide, the EO and PO may be added in a random or block fashion. From the standpoint of solubility at low temperatures, the alkylene oxide adduct (A) preferably contains a site with EO and PO added in a random fashion. The EO and PO are more preferably added in a random fashion.

For EO/PO addition in a random fashion, EO and PO are mixed to uniformity in a cylinder in advance, and the obtained mixture is added dropwise to a polyol.

For EO/PO addition in a block fashion, EO (or PO) is first allowed to react with a polyol. After it is confirmed that the pressure is reduced and the reaction is completed, the obtained product is allowed to react with PO (or EO).

In cases where alkylene oxides are added in a ternary combination, instead of a binary combination, in block and random fashions, EO (or PO) is allowed to react with a polyol, followed by dropwise addition of a mixture prepared in advance by mixing EO and PO to uniformity in a cylinder. Alternatively, a mixture prepared in advance by mixing EO and PO to uniformity in a cylinder may be added dropwise to a polyol, followed by reaction with EO (or PO).

The electrolyte solution of the present invention is for use in aluminum electrolytic capacitor applications. The aluminum electrolytic capacitor applications require reduction in the potassium or sodium content in the electrolyte solution to 10 ppm or less, preferably 1 ppm or less, by an adsorption treatment or the like because metal ions cause short circuit of capacitors. The potassium or sodium content in the alkylene oxide adduct (A) in the present invention is also reduced by an adsorption treatment.

The electrolyte solution for aluminum electrolytic capacitors needs to contain an electrolyte. In the present invention, the electrolyte contains a secondary or tertiary amine (B) and a carboxylic acid (C).

In order to reduce the rate of conductivity change, the amine compound is a secondary amine or a tertiary amine.

Specific examples of the secondary or tertiary amine (B) in the present invention include: secondary amines such as dimethylamine, ethylmethylamine, diethylamine, dibutylamine, piperidine, and piperazine; and tertiary amines such as trimethylamine, triethylamine, and dimethylethylamine.

Preferred are triethylamine, trimethylamine, dimethylethylamine, diethylamine, and dimethylamine. The secondary or tertiary amines (B) may be used alone or in combination of two or more thereof.

Examples of the carboxylic acid (C) in the present invention include divalent to tetravalent polycarboxylic acids (C1) and monocarboxylic acids (C2).

The carboxylic acid (C) desirably has a carbon number of 2 to 15. From the standpoint of the specific conductivity, the carbon number is preferably 4 to 10. The carboxylic acids (C) also may be used alone or in combination of two or more thereof.

Specific examples are listed below.

Divalent to Tetravalent Polycarboxylic Acid (C1)

Examples of (C1) include aliphatic polycarboxylic acids such as succinic acid, glutaric acid, adipic acid, pimelic acid, suberic acid, azelaic acid, sebacic acid, 1,6-decanedicarboxylic acid, and 1,10-decanedicarboxylic acid; unsaturated polycarboxylic acid such as maleic acid, citraconic acid, fumaric acid, and itaconic acid; aromatic polycarboxylic acids such as phthalic acid, isophthalic acid, terephthalic acid, trimellitic acid, and pyromellitic acid; and S-containing polycarboxylic acids such as thiodipropionic acid.

Monocarboxylic Acid (C2)

Examples of (C2) include saturated monocarboxylic acids (e.g., aliphatic monocarboxylic acids such as formic acid, acetic acid, propionic acid, butyric acid, isobutyric acid, valeric acid, caproic acid, enanthic acid, caplyric acid, pelargonic acid, lauric acid, myristic acid, stearic acid, behenic acid, and ethylhexanoic acid); unsaturated monocarboxylic acids such as acrylic acid, methacrylic acid, crotonic acid, and oleic acid; and aromatic monocarboxylic acids such as benzoic acid, cinnamic acid, and naphthoic acid.

In particular, aliphatic polycarboxylic acids are preferred, with divalent aliphatic carboxylic acids being more preferred. Still more preferred are adipic acid, azelaic acid, sebacic acid, 1,6-decanedicarboxylic acid, and 1,10-decanedicarboxylic acid. Azelaic acid is most preferred.

The ratio of the secondary or tertiary amine (B) to the carboxylic acid (C) may be any ratio. When (C) is divalent, the mole ratio (B):(C) is preferably 1.1:1 to 1.6:1. When the carboxylic acid (C) is monovalent, the mole ratio is preferably in the range of 0.5:1 to 0.7:1.

The total weight of the secondary or tertiary amine (B) and the carboxylic acid (C) is preferably 5 to 40% by weight, more preferably 6 to 30% by weight, still more preferably 10 to 20% by weight based on the total weight of (A) to (D).

The polar solvent (D) in the present invention includes (1) alcohols, (2) amides, (3) lactones, (4) nitriles, (5) sulfones, and (6) other polar organic solvents.

(1) Alcohols

Examples of (1) include monohydric alcohols (e.g., methyl alcohol, ethyl alcohol, propyl alcohol, butyl alcohol, diacetone alcohol, benzyl alcohol, amino alcohol, furfuryl alcohol), dihydric alcohols (ethylene glycol, propylene glycol, diethylene glycol, hexylene glycol) trihydric alcohols (e.g., glycerol), and tetrahydric or higher hydric alcohols (e.g., hexitol).

(2) Amides

Examples of (2) include formamides (e.g., N-methylformamide, N,N-dimethylformamide, N-ethylformamide, N,N-diethylformamide), acetamides (e.g., N-methylacetamide, N,N-dimethylacetamide, N-ethylacetamide, N,N-diethylacetamide), propionamides (e.g., N,N-dimethyl-propionamide), pyrrolidones (e.g., N-methylpyrrolidone, N-ethylpyrrolidone), and hexamethylphosphorylamide.

(3) Lactones

Examples of (3) include γ-butyrolactone (hereinafter referred to as "GBL"), α-acetyl-γ-butyrolactone, β-butyrolactone, γ-valerolactone, and δ-valerolactone.

(4) Nitriles

Examples of (4) include acetonitrile, propionitrile, butyronitrile, acrylonitrile, methacrylonitrile, and benzonitrile.

(5) Sulfones

Examples of (5) include sulfolane, dimethylsulfoxide, and ethylmethylsulfone.

(6) Other Organic Solvents

Examples of (6) include 1,3-dimethyl-2-imidazolidinone.

The organic solvents as the polar solvent (D) may be used alone or in combination of two or more thereof. In particular, alcohols are preferred. Dihydric alcohols are more preferred, and ethylene glycol is still more preferred.

In the electrolyte solution for aluminum electrolytic capacitors of the present invention, from the standpoint of the withstand voltage and the conductivity, the amount of the alkylene oxide adduct (A) is usually 3 to 40% by weight, preferably 5 to 40% by weight, more preferably 5 to 30% by weight, based on the total weight of (A) to (D). If the amount of (A) is less than 3% by weight, the effect of increasing the withstand voltage is low. If the amount of (A) is more than 40% by weight, the conductivity is low.

The amount of the secondary or tertiary amine (B) is usually 1 to 10% by weight, preferably 1.5 to 5% by weight, based on the total weight of (A) to (D).

The amount of carboxylic acid (C) is usually 5 to 20% by weight, preferably 7 to 15% by weight based on the total weight of (A) to (D).

The amount of the polar solvent (D) is usually 50 to 90% by weight, preferably 60 to 80% by weight, based on the total weight of (A) to (D).

The electrolyte solution of the present invention usually has a pH of 8.0 or less, preferably 6.0 to 7.0. The amount of (B) and (C) to be added is selected such that the pH is in this range.

The electrolyte solution of the present invention may contain, if necessary, various additives usually used in electrolyte solutions. Additives may be used alone or in combination of two or more thereof.

Examples of the additives include nitro compounds (for example, o-nitrobenzoic acid, p-nitrobenzoic acid, m-nitrobenzoic acid, o-nitrophenol, and p-nitrophenol), and boric acid. From the standpoint of the specific conductivity and the solubility in the electrolyte solution, the amount of the additive(s) to be added is preferably 5% by weight or less, particularly preferably 0.1 to 2% by weight based on the weight of the electrolyte solution.

The electrolyte solution for aluminum electrolytic capacitors of the present invention may be produced by any method. For example, the electrolyte solution can be obtained by dissolving the alkylene oxide adduct (A) in a solution of the secondary or tertiary amine (B) and the carboxylic acid (C) in the polar solvent (D). Alternatively, the electrolyte solution can be obtained by mixing a solution of the alkylene oxide adduct (A) in the polar solvent (D) with a solution of the secondary or tertiary amine (B) and the carboxylic acid (C) in the polar solvent (D). Although depending on the scale of production, the method of dissolving (A) to (C) into the polar solvent (D) may be, for example, stirring at room temperature using a common oar-type stirring blade.

The electrolyte solution of the present invention is used for aluminum electrolytic capacitors.

The aluminum electrolytic capacitor of the present invention characteristically includes the electrolyte solution for aluminum electrolytic capacitors of the present invention.

The aluminum electrolytic capacitors are not limited. Examples thereof include a wound electrolytic capacitor produced by winding an anode (aluminum oxide foil) having aluminum oxide on its surface and a cathode aluminum foil with a separator interposed therebetween. An electrolytic capacitor can be produced by impregnating a separator with the electrolyte solution of the present invention as an electrolytic solution for driving the electrolytic capacitor, enclosing the separator along with an anode and a cathode in a cylindrical aluminum casing closed at the bottom, and then sealing the opening of the aluminum casing with a sealing rubber.

Next, specific examples of the present invention are described. The present invention, however, is not limited to these examples.

EXAMPLES

The present invention is further described below with reference to examples and comparative examples. The present invention is not limited to them. The "%" refers to % by weight and "part(s)" refers to part(s) by weight, if not otherwise specified.

The number average molecular weight is the number average molecular weight calculated from the hydroxy value. The hydroxy value was measured in accordance with the method specified in JIS-K 1557-1.

Production Example 1

An amount of 182 parts by weight (1 mol) of sorbitol was mixed with 1.1 parts by weight (0.02 mol) of potassium hydroxide, and allowed to react with 1,056 parts by weight (24 mol) of ethylene oxide at 170° C. The reaction was terminated when pressure equilibrium was reached.

Subsequently, an adsorption treatment was performed to remove potassium with KYOWAAD 600 and KYOWAAD 700 (product names, absorbents available from Kyowa Chemical Industry Co., Ltd.). It was confirmed that potassium content was 1 ppm or less. It was confirmed with a proton nuclear magnetic resonance (H-NMR) device chart and the hydroxy value that a sorbitol ethylene oxide 24 mol adduct (A-1) was obtained. (A-1) had a number average molecular weight of 1,240.

Production Example 2

A pentaerythritol ethylene oxide 24 mol adduct (A-2) was obtained in the same manner as in Production Example 1 except that 136 parts by weight (1 mol) of pentaerythritol was used instead of sorbitol. (A-2) had a number average molecular weight of 1,100.

Production Example 3

A glycerol ethylene oxide 24 mol adduct (A-3) was obtained in the same manner as in Production Example 1 except that 92 parts by weight (1 mol) of glycerol was used instead of sorbitol. (A-3) had a number average molecular weight of 1,080.

Production Example 4

A sorbitol ethylene oxide 24 mol/propylene oxide 3 mol random adduct (A-4) was obtained in the same manner as in Production Example 1 except that a mixture of 1,056 parts by weight (24 mol) of ethylene oxide and 174 parts by weight (3 mol) of propylene oxide was used instead of 1,056 parts by weight of ethylene oxide alone. (A-4) had a number average molecular weight of 1,300.

Production Example 5

A glycerol ethylene oxide 15 mol/propylene oxide 14 mol random adduct (A-5) was obtained in the same manner as in Production Example 1 except that 92 parts by weight (1 mol) of glycerol was used instead of sorbitol, and that a mixture of 660 parts by weight (15 mol) of ethylene oxide and 812 parts by weight (14 mol) of propylene oxide was used instead of ethylene oxide alone. (A-5) had a number average molecular weight of 1,500.

Production Example 6

A glycerol ethylene oxide 25 mol/propylene oxide 1 mol random adduct (A-6) was obtained in the same manner as in Production Example 1 except that 92 parts by weight (1 mol) of glycerol was used instead of sorbitol, and that a mixture of 1,100 parts by weight (25 mol) of ethylene oxide and 58 parts by weight (1 mol) of propylene oxide was used instead of ethylene oxide alone. (A-6) had a number average molecular weight of 1,300.

Comparative Production Example 1

An amount of 62 parts by weight (1 mol) of ethylene glycol was mixed with 1.1 parts by weight (0.02 mol) of potassium hydroxide and allowed to react with 1,188 parts by weight (27 mol) of ethylene oxide at 170° C. The reaction was terminated when pressure equilibrium was reached. Subsequently, an adsorption treatment was performed to remove potassium with KYOWAAD 600 and KYOWAAD 700 (product names, absorbents available from Kyowa Chemical Industry Co., Ltd.). It was confirmed that the potassium content was 1 ppm or less. It was confirmed that a polyoxyethylene glycol (A'-1) with a number average molecular weight of 1,200 was obtained.

Examples 1 to 11

In ethylene glycol (D-1) as the polar solvent (D), diethylamine (B-1), dimethylamine (B-2), triethylamine (B-3), or trimethylamine (B-4), and azelaic acid (C-1) or 1,6-decanedicarboxylic acid (C-2), each in the amount (parts by weight) shown in Table 1, were neutralized and dissolved at room temperature. Thereafter, (A-1) to (A-6) were added. The solutions were uniformly mixed to prepare electrolyte solutions (E-1) to (E-11).

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| | Electrolyte solution (E) | | (E-1) | (E-2) | (E-3) | (E-4) | (E-5) | (E-6) | (E-7) | (E-8) | (E-9) | (E-10) | (E-11) |
| Amount (parts by weight) | Trihydric to octahydric polyol alkylene oxide adduct (A) | (A-1) | 120 | 120 | 120 | — | — | — | 120 | — | — | 120 | 120 |
| | | (A-2) | — | — | — | 120 | — | — | — | — | — | — | — |
| | | (A-3) | — | — | — | — | 120 | — | — | — | — | — | — |
| | | (A-4) | — | — | — | — | — | 120 | — | — | — | — | — |
| | | (A-5) | — | — | — | — | — | — | — | 120 | — | — | — |
| | | (A-6) | — | — | — | — | — | — | — | — | 120 | — | — |
| | | (A'-1) | — | — | — | — | — | — | — | — | — | — | — |
| | Secondary or tertiary amine (B) | (B-1) | 38 | 19 | 70 | 38 | — | 38 | — | — | 38 | — | 38 |
| | | (B-2) | — | — | — | — | 22 | — | — | 22 | — | — | — |
| | | (B-3) | — | — | — | — | — | — | — | — | — | 40 | — |
| | | (B-4) | — | — | — | — | — | — | 30 | — | — | — | — |
| | | (B'-1) | — | — | — | — | — | — | — | — | — | — | — |
| | | (B'-2) | — | — | — | — | — | — | — | — | — | — | — |
| | Carboxylic acid (C) | (C-1) | 83 | 83 | 83 | 83 | 83 | 83 | 83 | 83 | 83 | 83 | — |
| | | (C-2) | — | — | — | — | — | — | — | — | — | — | 83 |
| | Polar solvent (D) | (D-1) | 759 | 778 | 727 | 759 | 775 | 759 | 767 | 775 | 759 | 759 | 759 |
| | POVAL | | — | — | — | — | — | — | — | — | — | — | — |
| Performance evaluation | Initial conductivity (mS/cm) | | 1.5 | 1.5 | 1.1 | 1.5 | 1.5 | 1.5 | 1.7 | 1.5 | 1.5 | 1.0 | 1.0 |
| | Rate (%) of conductivity change | | 25 | 25 | 25 | 25 | 25 | 25 | 22 | 25 | 25 | 28 | 25 |
| | Spark voltage (V) | | 530 | 500 | 530 | 510 | 500 | 540 | 530 | 550 | 550 | 470 | 530 |

| | | | Comparative Example | | | | |
|---|---|---|---|---|---|---|---|
| | | | 1 | 2 | 3 | 4 | 5 |
| | Electrolyte solution (E) | | (E'-1) | (E'-2) | (E'-3) | (E'-4) | (E'-5) |
| Amount (parts by weight) | Trihydric to octahydric polyol alkylene oxide adduct (A) | (A-1) | — | 120 | 120 | — | — |
| | | (A-2) | — | — | — | — | — |
| | | (A-3) | — | — | — | — | — |
| | | (A-4) | — | — | — | — | — |
| | | (A-5) | — | — | — | — | — |
| | | (A-6) | — | — | — | — | — |
| | | (A'-1) | 120 | — | — | — | — |
| | Secondary or tertiary amine (B) | (B-1) | 38 | — | — | — | 38 |
| | | (B-2) | — | — | — | — | — |
| | | (B-3) | — | — | — | — | — |
| | | (B-4) | — | — | — | — | — |
| | | (B'-1) | — | — | Neutralized with gas | Neutralized with gas | — |
| | | (B'-2) | — | 38 | — | — | — |
| | Carboxylic acid (C) | (C-1) | 83 | 83 | 83 | 83 | 83 |
| | | (C-2) | — | — | — | — | — |
| | Polar solvent (D) | (D-1) | 759 | 759 | 759 | 759 | 759 |
| | POVAL | | — | — | — | 30 | 30 |
| Performance evaluation | Initial conductivity (mS/cm) | | 0.5 | 1.1 | 1.5 | 1.5 | 1.2 |
| | Rate (%) of conductivity change | | 30 | 80 | 70 | Not measurable due to gelation | Not measurable due to gelation |
| | Spark voltage (V) | | 470 | 490 | 470 | 490 | 480 |

Comparative Example 1

A comparative electrolyte solution (E'-1) was produced in the same manner as in Example 1 except that (A'-1) obtained in Comparative Production Example 1 was used instead of (A-1) in Example 1.

Comparative Example 2

A comparative electrolyte solution (E'-2) was produced in the same manner as in Example 1 except that n-butylamine (B'-2) was used instead of (B-1) in Example 1.

Comparative Example 3

Azelaic acid (C-1) was added to ethylene glycol (D-1) and dispersed by stirring. Ammonia gas (B'-1) was then blown into the dispersion. The amount (parts by weight) of each component was as shown in Table 1. When the pH reached 6.9 and (C-1) was dissolved, the blowing was terminated. Thereafter, the sorbitol ethylene oxide 24 mol adduct (A-1) was added, and the mixture was uniformly mixed to prepare a comparative electrolyte solution (E'-3).

Comparative Example 4

Azelaic acid (C-1) was dispersed into ethylene glycol (D-1), and then ammonia gas (B'-1) was blown into the dispersion. The amount (parts by weight) of each component was as shown in Table 1. When the pH reached 6.9 and (C-1) was dissolved, the blowing was terminated. Thereafter, POVAL (PVA-105 (available from Kuraray Co., Ltd.)) was added, and dissolved by mixing at 120° C. for two hours. Thus, a comparative electrolyte solution (E'-4) was obtained.

Comparative Example 5

In ethylene glycol (D-1), diethylamine (B-1) and azelaic acid (C-1) were neutralized and dissolved at room temperature. The amount (parts by weight) of each component was as shown in Table 1. Thereafter, POVAL (PVA-105 (available from Kuraray Co., Ltd.)) was added and dissolved by mixing at 120° C. for two hours. Thus, a comparative electrolyte solution (E'-5) was obtained.

The initial conductivity, the rate of conductivity change after 1,000 hours at 125° C., and the spark voltage were evaluated by the following method using the electrolyte solutions obtained in Examples 1 to 11 and Comparative Examples 1 to 5. Table 1 shows the results.

<Initial Conductivity and Rate of Conductivity Change after Heat Resistance Test>

First, the electrolyte solutions obtained in the examples and comparative examples were measured for initial conductivity at 30° C. using a conductivity meter CM-40S (TOA ELECTRONICS Ltd.).

Under these evaluation conditions, the initial conductivity is usually preferably 0.9 mS/cm or higher.

Next, each electrolyte solution was sealed in a pressure-resistant container, and left to stand in a dryer at 125° C. for 1,000 hours to perform a heat resistance test. The electrolyte solution after the heat resistance test was taken out of the pressure-resistant container, and measured for the conductivity at 30° C. as in the measurement of the initial conductivity. The rate (%) of conductivity change before and after the heat resistance test was calculated.

Rate (%) of conductivity change=[(Initial conductivity−Conductivity after heat resistance test)/Initial conductivity]×100

Under these evaluation conditions, the rate (%) of conductivity change is usually preferably 30% or less.

The electrolyte solutions of Comparative Examples 4 and 5, prepared using POVAL, gelled after the heat resistance test, so that their conductivity was not measurable.

<Spark Voltage>

A chemically etched aluminum foil (10 $cm^2$) for high voltage was used as the anode and a plain aluminum foil (10 $cm^2$) as the cathode. The spark voltage (V) of each electrolyte solution was measured at 25° C. when a constant current (2 mA) was applied.

Under this evaluation conditions, the spark voltage is usually preferably 450 V or higher.

The performance evaluation results in Table 1 show that all of the three properties, the initial conductivity, the rate of conductivity change, and the spark voltage, were good in the electrolyte solutions of Examples 1 to 11 of the present invention.

Comparative Example 1, in which polyoxyethylene glycol (A'-1) was used instead of (A) in the present invention, was poor in the initial conductivity. The electrolyte solution of Comparative Example 2, in which a primary amine was used instead of a secondary or tertiary amine, and that of Comparative Example 3, in which ammonia gas was used, were poor in the rate of conductivity change.

The electrolyte solution of Comparative Example 5, in which POVAL was used instead of (A) in the present invention, gelled after the heat resistance test. The conductivity was thus not measurable (poor in the rate of conductivity change).

Similarly, the electrolyte solution of Comparative Example 4, in which POVAL was used instead of (A) in the present invention and ammonia gas was used instead of a secondary or tertiary amine, also gelled after the heat resistance test.

INDUSTRIAL APPLICABILITY

The electrolyte solution for aluminum electrolytic capacitors of the present invention and the aluminum electrolytic capacitor including the electrolyte solution are less likely to degrade and thus suitably used.

Furthermore, the electrolyte solution and the aluminum electrolytic capacitor are suitable for applications which require long life and reliability, such as home appliance applications or in-vehicle applications.

The invention claimed is:

1. An electrolyte solution for aluminum electrolytic capacitors, the electrolyte solution comprising:
    a trihydric to octahydric polyol alkylene oxide adduct (A);
    a secondary or tertiary amine (B);
    a carboxylic acid (C); and
    a polar solvent (D),
    wherein the trihydric to octahydric polyol in the alkylene oxide adduct (A) is at least one selected from the group consisting of glycerol, trimethylolpropane, hexitol, sorbitol, pentaerythritol, and dip entaerythritol.

2. The electrolyte solution for aluminum electrolytic capacitors according to claim 1, containing (A) in an amount of 5 to 40% by weight based on the total weight of (A) to (D).

3. An electrolyte solution for aluminum electrolytic capacitors, the electrolyte solution comprising:
- a trihydric to octahydric polyol alkylene oxide adduct (A);
- a secondary or tertiary amine (B);
- a carboxylic acid (C); and
- a polar solvent (D),
- wherein the alkylene oxide in the alkylene oxide adduct (A) is a combination of ethylene oxide (EO) and propylene oxide (PO), and
- a mole ratio of EO to PO, EO/PO, is 50/50 to 99/1.

4. The electrolyte solution for aluminum electrolytic capacitors according to claim 3,
- wherein the alkylene oxide adduct (A) comprises a site in which the ethylene oxide and the propylene oxide have been added in a random fashion.

5. An electrolyte solution for aluminum electrolytic capacitors, the electrolyte solution comprising:
- a trihydric to octahydric polyol alkylene oxide adduct (A);
- a secondary or tertiary amine (B);
- a carboxylic acid (C); and
- a polar solvent (D),
- wherein an average addition mole number of an ethylene oxide in (A) is 12.0 to 42.0.

6. An electrolyte solution for aluminum electrolytic capacitors, the electrolyte solution comprising:
- a trihydric to octahydric polyol alkylene oxide adduct (A);
- a secondary or tertiary amine (B);
- a carboxylic acid (C); and
- a polar solvent (D),
- wherein (A) has a number average molecular weight of 1,000 to 2,200.

7. An aluminum electrolytic capacitor, comprising:
- the electrolyte solution for aluminum electrolytic capacitors according to claim 1.

8. An aluminum electrolytic capacitor, comprising:
- the electrolyte solution for aluminum electrolytic capacitors according to claim 3.

9. An aluminum electrolytic capacitor, comprising:
- the electrolyte solution for aluminum electrolytic capacitors according to claim 5.

10. An aluminum electrolytic capacitor, comprising:
- the electrolyte solution for aluminum electrolytic capacitors according to claim 6.

\* \* \* \* \*